Sept. 21, 1965 LE ROY J. LEISHMAN 3,207,899
X-RAY PHOTOTIMER DETECTORS

Filed May 7, 1962 2 Sheets-Sheet 1

LeROY J. LEISHMAN
INVENTOR.

BY
LeRoy J. Leishman

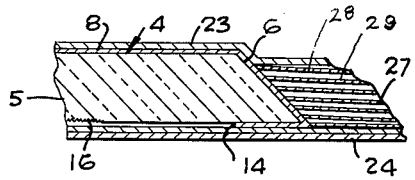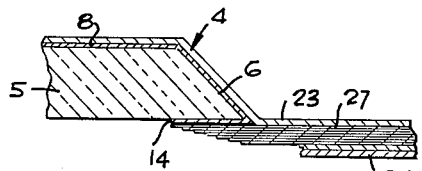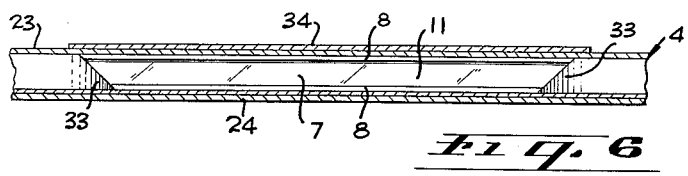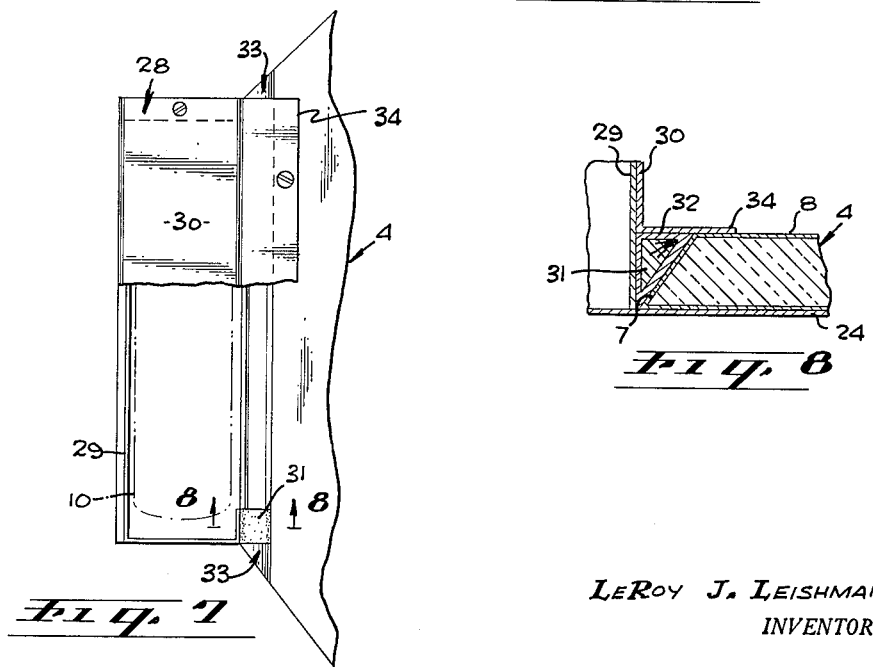

United States Patent Office 3,207,899
Patented Sept. 21, 1965

3,207,899
X-RAY PHOTOTIMER DETECTORS
Le Roy J. Leishman, 3460 Wilshire Blvd.,
Los Angeles, Calif.
Filed May 7, 1962, Ser. No. 192,924
17 Claims. (Cl. 250—71.5)

This invention pertains to so-called photo-timer pick-ups or detectors for use in connection with radiography, and more particularly to the type commonly called wafer pick-ups which are positioned between the patient and the film.

While embodiments of the invention herein described are useful in radiography generally, the illustrative embodiment has many features especially useful in connection with spot-film devices.

Until recent years, the length of an X-ray exposure has been calculated in advance in accordance with the film-to-target distance and the thickness of the bodily section to be traversed by the X-rays. Not only has this consumed valuable time, but it does not take into consideration the differing densities of the patients—that is, their differing transparencies or opacities as far as the X-rays are concerned. Photo-timing not only makes it unnecessary to precalculate the length of an exposure, but it also automatically compensates for the differing transparencies of various patients, and the X-rays are automatically shut off when the film has been exposed long enough to produce a satisfactory image with the rays that have actually traversed the patient.

The first photo pick-ups that were used with spot film devices were mounted upon the ends of pivoted arms so that they could be moved over the center of the fluoroscopic screen just in advance of the exposure, it being impractical, of course, to have the pirk-up permanently in such a position. These photo detectors were superseded by the so-called bird-watcher type in which visual rays from the center of the screen were caused to fall upon the photo-tube. These have not proven entirely satisfactory because rays from other portions of the screen invariably reach the tube even when the optical system is such that the tube can "see" only the central section of the screen. This is due to the fact that the visual rays from the screen center must pass through the protective lead glass that overlays the screen, and visual rays from marginal portions of the screen are invariably transmitted through the glass to the central section that is being "scanned."

Various means have been proposed and used for picking up visual rays from the center portion of an auxiliary screen and for masking off all but a selected central area, the rays from this area being transmitted through light-transmitting substances to a photo-tube located outside of the region of the regular fluoroscopic screen itself. These have suffered from the defect that more rays per square inch reach the tube from portions of the selected area closest thereto than from portions of this area more remote from the tube. One of the objects of the present invention is to correct this defect.

Another object is to direct as much of the visual rays from the area being "scanned" to the tube as possible and to do this by means of reflection from various surfaces or edges of the light-conducting medium.

If one of the reflecting edges is to be disposed at an angle over any portion of the film or of the standard fluoroscopic screen within the view of the radiologist, this would result in some X-rays reaching the screen used for fluoroscopy from regions beyond the light-conducting medium or plate. This would cause the internal construction of the wafer pick-up to show in the film and sometimes even on the fluoroscopic screen that is being viewed.

Accordingly, another object of the present invention is to provide means for producing the same X-ray density over the entire area through which X-rays must pass, irrespective of whether or not such rays are traversing the light-transmitting plate.

The light-transmitting medium is of course not required beyond the side of the area to be scanned that is most remote from the photo-tube. In certain types of spot film devices in which attempts are made to make the equipment as thin as possible, it is desirable to make use of any extra internal space that may be saved by making the pick-up unit thinner in the region beyond the aforementioned remote side of the scanning area. In order to make this possible, another object of the invention is to provide substantially uniform density throughout the wafer despite differences in thickness.

Still other objects will appear as the specification proceeds.

In the drawings:

FIG. 4 is an enlarged and somewhat distorted broken-away sectional view through the pick-up in the region that includes the sloping end of the light-transmitting medium.

FIG. 5 illustrates an alternative construction.

FIG. 6 is a fragmentary left end view of the component shown in FIGS. 2 and 3, with the photo tube and its housing removed.

FIG. 7 is a top view, partly broken away, of the left end of the device of FIG. 2.

FIG. 8 is a view taken on line 8—8 of FIG. 7.

In the presently preferred embodiment of my invention, the various components are assembled on, and attached to, a sheet of rigid material having low resistance to the passage of X-rays. I prefer to use a sheet of linen base Bakelite 1 for this purpose although other materials may, of course, be used. Over the base 1 is superimposed a thin sheet of material having low X-ray density, this sheet 2 being coated with a phosphor that glows under the influence of X-rays. An ordinary X-ray screen usually offers too much resistance to the passage of X-rays to be used for this purpose, and I therefore prefer to use a much lighter and less dense medium for receiving the phosphor. This screen 2 extends all the way across the region beneath the regular fluoroscopic screen 3, FIG. 1. Rays from only a central area of the screen (usually about 3 inches square) are used, but the special pick-up screen nevertheless extends over the entire area beneath the regular fluoroscopic screen 3 for the reason that it is almost impossible in standard manufacturing procedures to use a smaller screen and to surround it with a layer of less expensive material of the same opacity. Not only is it difficult to match the opacity of the screen 2, but it is extremely difficult to prevent the juncture of the two materials from casting a shadow or line upon the film within the cassette that is moved over the pick-up unit just before an exposure is made.

Figure 2:
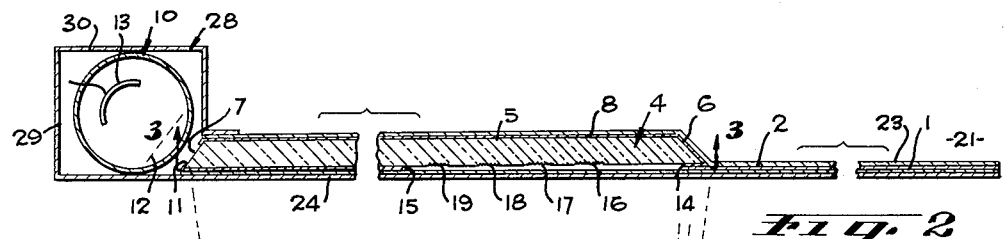
FIG. 2 is a section taken on line 2—2 of FIG. 1.
Figure 3:
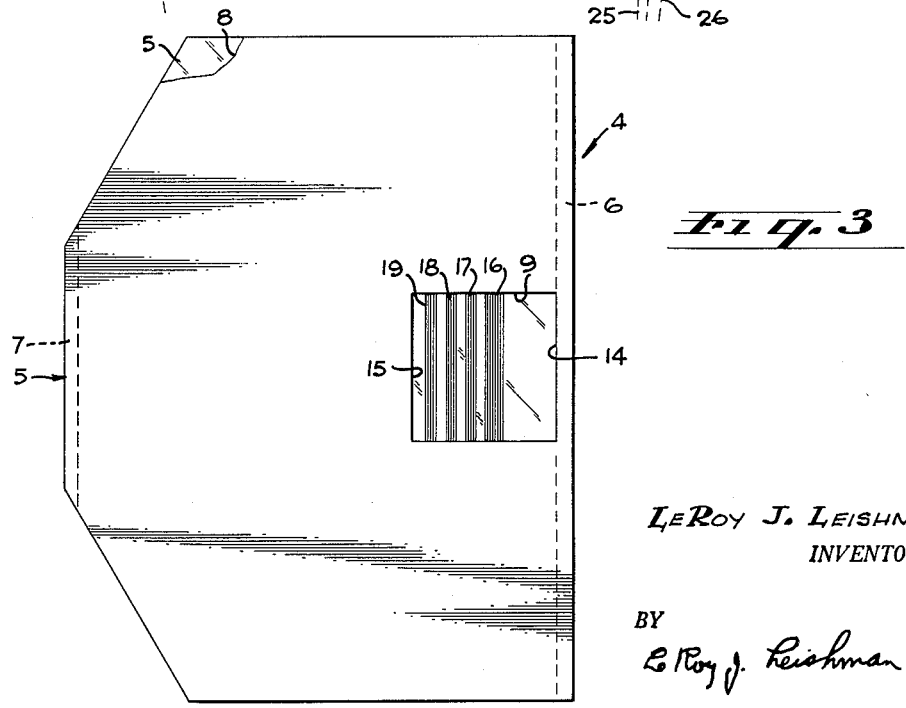
FIG. 3 is a section taken through the photo pick-up on line 3—3 of FIG. 2 in order to show certain structural features of one of the components.

A prism assembly 4, FIG. 3, is positioned over the special screen 2 as shown in FIG. 2. The identifying numeral 4 does not appear in FIG. 2, however, to avoid confusion between the prism assembly itself and its integral parts.

The prism assembly 4 comprises a sheet of light-transmitting material such as Lucite, or Plexiglas whose index of refraction is such that a high portion of the light that is internally reflected from its surfaces will remain therein. The surfaces of the prism 5 are preferably polished to assure satisfactory internal reflection, it being especially desirable to have a smooth finish on the sloping or angled edge 6 of the prism. The opposite edge 7 of the prism is also polished and is sloped substantially as shown in FIG. 2 for reasons hereinafter to be explained. The prism 5 has a covering 8 that will reflect light from its inner surface which contacts the outer surface of the prism itself. This covering may be a thin, metallic foil, a film having a reflecting coating or plating thereon, or it may be a suitable coating applied directly by an appropriate means to the surface of the prism itself.

The covering 8 should be opaque in order to prevent light from entering the prism excepting through openings in the covering especially provided for such purpose. The covering thus serves not only as a means of keeping light within the prism, but also as a mask to prevent fluorescent light from the special screen 2 from entering the prism excepting from the specific area that is to be used for photo timing. This area is usually about 3″ in diameter or 3″ square, and it is defined by the edges of the opening 9 in the covering 8.

The optimum size of the opening 9 is determined by two considerations: First, it must not extend beyond the confines of the smallest spots or sections into which the film is usually divided. Most spot film devices provide for from one to four exposures on the same film—in fact, some European Spot Film Devices provide for as many as six exposure spots on the same film. The areas of the film that are not to be exposed for any given "shot" are, of course, masked off by appropriate cones removably or slidably attached to the bottom of the spot device. The region to which the photo-timing device is to respond must therefore be smaller than the smallest cone that is to be used. Second, it is not advisable to have the area too small, as a particularly dense portion of the body section being radiographed might then cast its image in this particular region and thus produce a false sample of the X-ray density of the region. It is accordingly desirable that the opening 9 be at least large enough to include the duodenal cap of the stomach or an entire region that may include the gall bladder rather than a small portion thereof. This avoids the possibility that the pick-up device will respond to a region that has been made unusually dense by the presence of large stones.

The covering 8 is provided with a second opening 11 to permit light to escape from the prism and reach the photo-tube 10. This second opening 11 reveals at least a portion of the sloping edge 7. The photo-tube 10 is so located with respect to the opening 11 that light passing through this opening will be received through the grid 12 of the tube and at least a portion of it fall upon the plate 13.

As explained in the objects, it is important that the same amount of light reach the photo-tube from all possible divisions of unit areas of the total region to which the photo-tube is to respond. Unless special means are provided to prevent it, more light will reach the tube from the side of the unmasked area that is closest to the tube than from portions within its area that are more remote. In the past, it has been proposed to equalize this response by interfering with the admission of fluorescent rays from regions within the critical area from which the transmission of light is usually the greatest. The present invention equalizes the response by picking up and transmitting more of the available light from the more remote regions than would normally be the case and by progressively decreasing this response as the area becomes closer to the pick-up tube. This is done in two ways.

The first means for increasing the response to light picked up from the more remote sections within the opening 9 is to provide the prism 5 with a sloping reflecting surface 6. The reflecting surface may be the aforementioned inner surface of the covering 8. Some of the light from portions of the screen 2 that are close to the more remote edge 14 of the opening 9 will of course reach the reflective surface of the sloping edge 6 of the prism and be reflected back. Some of these reflected rays will reach the lower side of the prism and be reflected upward at an angle and thence down again and by a series of reflections ultimately reach the lower side of the prism at the left end where they will be reflected outward through the sloping edge 7 of the prism from whence they escape through the opening 11 in the covering to the photo-tube 10. The angle of the sloping side 6 and its proximity to the edge 14 of the opening 9 in the prism wrapper 8 is one of the factors determining the amount of light from the remote side of the opening 9 that will reach the photo tube. As the distance from this region that is favored by the reflective surface 6 to the tube decreases, the light received and reflected within the prism decreases somewhat and then increases in portions of the area near the side 15 unless special provisions are made to equalize the amount of light entering the prism.

If the otherwise smooth surface of the prism is interrupted, as by sand-blasting, pitting or by scoring, the amount of light entering the prism may be greatly increased. One satisfactory way of doing this is illustrated in FIGURES 2 and 3 where four groups of scribed lines are shown, group 16 having more striations than the other groups and therefore being wider.

The method of equalizing the light transmitted through a transparent plate in a direction generally parallel to its surfaces from a window in a contacting mask by means of interruptions in the surface of the plate adjoining the opening is, of course, useful irrespective of the nearby presence of an inclined reflecting surface such as the surface 6. This surface may be much further away from the opening than the present illustrations show, or it may be missing entirely. If the reflecting surface is merely more remote, the effect of the reflecting surface on light received from portions of the receiving area near the far side will be much less than when the reflective surface is located substantially as shown in FIGURES 2 and 3, and the interruptions in the surface of the light reflecting plate adjoining the window in the mask must therefore be varied accordingly. If the reflecting surface is absent altogether, then the number, size or extent of the interruptions of the surface must increase with the distance from the pickup or photo tube.

An inclined surface such as surface 6 may be employed for other than reflecting purposes. For example, in some spot film devices, the carriage that transports the cassette 20 from its home or inactive position shown in FIG. 1, may include mechanical parts which, for certain positions of the cassette, move into the region 21 designated in FIGS. 1 and 2. The region 21 is directly below the left side of the regular fluoroscopic screen 3, although not in the region where any part of the cassette 20 would itself be positioned during the making of an exposure. If the entire spot film device is to be kept as thin as possible, it is therefore advisable to construct the entire photo-timer pickup device so that it is thinner in the region 21 to allow for such mechanical parts, rather than to raise the level of the cassette itself to permit these parts to be interposed between the cassette and the uniformly thick pickup having a thickness like the portions of the pickup device where the prism 5 is located. Since the region 21 is within the path of X-rays reaching the regular fluoroscopic screen 3 and also within the path of X-rays reaching the film in the cassette 20 when it is positioned for making exposures of certain sizes—particularly, large exposures which may occupy the entire area of the film—it is necessary that the opacity of the photo pickup device in the region beyond the prism 5 be the same as in the region where the X-rays must traverse the prism. X-rays passing through the sloping side 6 of course encounter less resistance in regions close to the tip of the sloping side than in the thicker portions of the tapered end. In order to prevent the X-ray shadows on the film or on the fluoroscopic screen 3 from being more dense where the rays have traversed these thicker portions than where the rays have passed through thinner parts of the tapered end of the prism, or through portions of the spot film device that are beyond the prism (as in the region 21) it is necessary that a thin layer of material having much greater opacity to the X-rays than does the prism 5 be sandwiched between the top 23 and bottom 24 of the pickup device in the region 21, and that the total thickness of this equalizing layer gradually diminish in the region that may be traversed by X-rays between the rays 25 and 26 indicated in FIG. 2. In one embodiment of the present invention in which the light transmitting plate or prism 5 is ⅜ of an inch thick, I use seven sheets of aluminum, each .004 thick, making a total aluminum thickness of .0028, this amount of aluminum casting a shadow having substantially the same density as the greater thickness of the prism material. The left ends of the sheets of the aluminum foil may be arranged substantially as shown in FIG. 4, where the thickness of the laminated aluminum wedge is greatly exaggerated for purposes of illustration. Here, it will be seen that the top layer of aluminum foil 28 extends much further to the left than does the second layer 29, and that each successive layer is correspondingly shorter so that as there is less prism material in the paths of the X-rays, the number of sheets of aluminum foil that must be transversed by the rays is correspondingly greater.

My preferred method of arranging the sheets of aluminum foil is shown in FIG. 5 where the thickness of the aluminum sheets is again greatly exaggerated, although the exaggeration is much less than in FIG. 4. The total thickness of the aluminum sheets and of the prism 5 must, of course, vary according to the general construction of the spot device and according to the total thickness of the prism as well as the material from which the prism and the opaque sheets 27 are constructed. The aforementioned thicknesses of .375 and .028 are merely those used in one embodiment. Inasmuch as the total thickness of the aluminum sheets 27 is actually only about the thickness of one of the sheets as pictured in FIG. 5, the presence of this material, jutting under the tapered edge of the prism assembly 4, does not raise the tapered end of the prism an appreciable distance higher than the opposite tapered end near the pickup tube 10. The presence of the prism assembly on top of the ends of the aluminum sheets helps to keep the sheets in place.

The entire pickup unit must be so encased that outside light cannot enter. The light-excluding covering 8 on the prism is, of course, an effective light shield, but even a small light leak, such as might occur through an abrasion in the covering 8, can result in a situation in which the pickup tube 10 does not give a true indication of the amount of light received through the window 9 between the two edges 14 and 15 of the opening. Part of the light-excluding means is formed by the base member 24 of the entire unit and part is formed by the top portion 23, which, of course, must conform to the contour of the prism 5 and its sloping end 6.

In one embodiment of the invention, I provide a separate light excluding cover for the tube. This cover 28 may be formed of one or more pieces, although I prefer to use two pieces, such as piece 29 for the main body of the housing and cover 30 for the top. To prevent light from reaching the tube from the region 33, FIG. 7, where the left end of the prism tapers off, I insert a wedge 31 of opaque material between the tapering edge of the prism assembly 4 and the right side of the tube housing 29. I also employ a gasket of felt or similar soft material 32, as indicated in FIG. 8. Other light-sealing means may, of course, appropriately be used wherever light may enter. The casing for the prism assembly, the screen, mask and the sheets of opacity-compensating material 27 must also extend around the various edges, although this detail is not illustrated in the figures.

Figure 1:
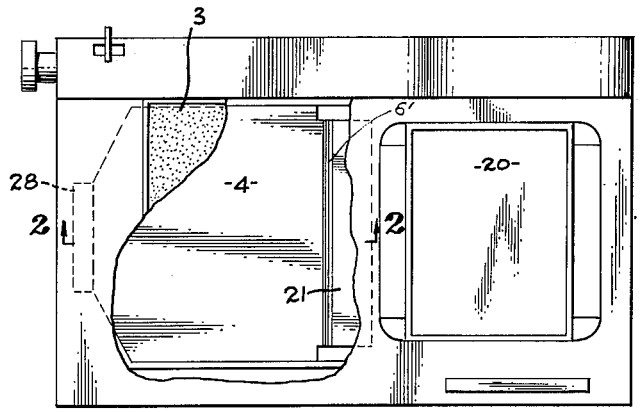
FIG. 1 is a plan view of a spot film device with a portion of the top or cover broken away in order to show the pick-up unit and to reveal its position within the spot film device.

The photo tube must of course be provided with appropriate terminals and conductors leading to the outside surface. The entire assembly may be so constructed that it may be mounted on the underside of the spot device, but I prefer that it be mounted on the inside over the opening in the bottom of the spot device that is usually provided beneath the regular fluoroscopic screen area in order to keep as much unnecesary material as possible out of the path of the X-rays. In FIG. 1, the pickup device is shown in the preferred inside position, the sloping edge 6 of FIGS. 2 and 3 being indicated in this figure by the designation 6'. Various features of the illustrative embodiment herein described may, of course, be independently used, and the combination set forth in the appended claims may be altered by substituting other components for the elements set forth in the claims providing such substitute components perform the same functions as those that are replaced; and the various elements may be re-arranged, reversed and otherwise oriented without departing from the broad spirit of the invention.

I claim:

1. In an X-ray photo-timer pick-up device for use between the patient and an X-ray film, a combination including: a photo tube; an X-ray transparent sheet bearing a phosphor that will fluoresce under the influence of X-rays; a plate of material capable of transmitting rays from said sheet; a covering around the greater portion of said plate, said covering having reflective properties at least on the surface contacting said plate, said covering having a first opening therein to pass light from a portion of said sheet to said plate, and a second opening therein to pass light from said plate to said tube.

2. In an X-ray photo-timer pick-up device for use between the patient and an X-ray film, a combination including: a photo tube; an X-ray sensitive fluorescent screen; a light-transmitting plate at least partially superimposed over said screen, said plate so positioned with respect to said tube that a portion of the light that may be passing therethrough will reach said tube; and a mask interposed between said plate and said screen, said mask having an opening therein for passing fluorescent light from a limited portion of said screen to said plate.

3. In an X-ray photo-timer pick-up device for use between the patient and an X-ray film, a combination including: a phototube; an X-ray sensitive fluorescent screen; a light-transmitting plate at least partially superimposed over said screen, said plate so positioned with respect to said tube that a portion of the light that may be passing therethrough will reach said tube, the edge of said plate that is most remote from said tube forming an acute angle with respect to said screen; and a mask interposed between said plate and said screen, said mask having an opening therein for passing fluorescent light from a limited portion of said screen to said plate.

4. In an X-ray photo-timer pick-up device for use between the patient and an X-ray film, a combination including: a photo tube; an X-ray sensitive fluorescent screen; a visible light opaque mask of X-ray transparent material superposed over said screen and having an opening therein for passing visible light from a selected area of the screen; a light-transmitting plate adjoining said tube and at least partially superposed over said mask, the area of said plate that overlies the opening in the mask having interruptions so arranged in its otherwise smooth surface that substantially the same amount of light will reach the tube from all portions of the screen within said opening.

5. In an X-ray photo-timer pick-up device for use between the patient and an X-ray film, a combination including: a photo tube; an X-ray sensitive fluorescent screen; a visible light opaque mask of X-ray transparent material superposed over said screen and having an opening therein for passing visible light from a selected area of the screen; a light-transmitting plate adjoining said tube and at least partially superposed over said mask, the area of said plate that overlies the opening in the mask having light-receiving interruptions on its otherwise smooth surface that increase in density per unit of area as their distance from the tube decreases.

6. In an X-ray photo-timer pick-up device for use between the patient and an X-ray film, a combination including: a phototube; an X-ray sensitive fluorescent screen; a light-transmitting plate at least partially superimposed over said screen, said plate so positioned with respect to said tube that a portion of the light that may be passing therethrough will reach said tube, the edge of said plate that is most remote from said tube forming an acute angle with respect to said screen; a mask interposed between said plate and said screen, said mask having an opening therein for passing fluorescent light from a limited portion of said screen to said plate; and a plurality of sheets of material having greater opacity to X-rays for a given thickness than said plate, said sheets adjoining said edge of said plate and so individually positioned with respect thereto that X-rays passing through said screen at the juncture of said plate and said sheets will pass through a greater number of sheets as the path of the X-rays through said edge becomes shorter.

7. In an X-ray photo-timer pick-up device for use between the patient and an X-ray film, a combination including: a photo tube; an X-ray sensitive fluorescent screen; a visible light opaque mask of X-ray transparent material superposed over said screen and having an opening therein for passing light from a selected area of the screen; a plurality of sheets of material having low resistance to the passage of X-rays, said sheets generally paralleling said mask and screen and positioned on the side of said opening opposite from said tube, said sheets having their edges that are closest to said opening arranged in stepped relationship with respect to the others; and a light-transmitting plate whose resistance to the passage of X-rays is substantially equal to that of all of said sheets, said plate positioned with one edge adjoining said tube and its opposite edge overlying the stepped portions of said sheets, said opposite edge forming an acute angle with respect to said screen.

8. In an X-ray photo-timer pickup device for use between the patient and an X-ray film, a combination including: a photo tube; an X-ray sensitive fluorescent screen, a visible light opaque mask of X-ray transparent material superposed over said screen and having an opening therein for passing light from a selected area of the screen; a plurality of sheets of material having low resistance to the passage of X-rays, said sheets generally paralleling said mask and screen and positioned on the side of said opening opposite from said tube, said sheets having their edges that are closest to said opening arranged in stepped relationship with respect to the others; a light-transmitting plate whose resistance to the passage of X-rays is substantially equal to that of all of said sheets, said plate positioned with one edge adjoining said tube and its opposite edge overlying the stepped portions of said sheets, said opposite edge forming an acute angle with respect to said screen; and light-excluding means encasing said tube, plate, sheets, mask and screen.

9. In an X-ray photo-timer pick-up device for use between the patient and an X-ray film, a combination including: a photo tube; an X-ray transparent sheet bearing a phosphor that will fluoresce under the influence of X-rays; a plate of material capable of transmitting rays from said sheet; a covering around the greater portion of said plate, said covering exhibiting light-reflecting properties at least on the surface contacting said plate and having a first opening therein to pass light from a portion of said sheet to said plate and a second opening therein to pass light from said plate to said tube; and light-excluding means encasing said tube, sheet, plate and covering.

10. In an X-ray photo-timer pick-up device for use between the patient and an X-ray film, a combination including: a photo tube; an X-ray sensitive fluorescent screen; a light-transmitting plate at least partially superimposed over said screen, said plate so positioned with respect to said tube that a portion of the light that may be passing therethrough will reach said tube; a mask interposed between said plate and said screen, said mask having an opening therein for passing fluorescent light from a limited portion of said screen to said plate; and light-excluding means encasing said tube, plate, sheets, mask and screen.

11. In an X-ray photo-timer pick-up device for use between the patient and an X-ray film, a combination including: a photo tube; an X-ray sensitive fluorescent screen; a light-transmitting plate overlying at least a portion of said screen and having one edge positioned near the light-receiving portion of said tube and an opposite edge formed at an acute angle with respect to said screen; and a covering around the greater portion of said plate, said covering exhibiting light-reflecting properties at least on the surface contacting said plate and having a first opening therein to pass light from a portion of said screen to said plate and a second opening therein to pass light from said plate to said tube.

12. In an X-ray photo-timer pick-up device for use between the patient and an X-ray film, a combination including: a photo tube; an X-ray sensitive fluorescent screen; a light-transmitting plate overlying at least a portion of said screen and having one edge positioned near the light-receiving portion of said tube and an opposite edge formed at an acute angle with respect to said screen; a covering around the greater portion of said plate, said covering exhibiting light-reflecting properties at least on the surface contacting said plate and having a first opening therein to pass light from a portion of said screen to said plate and a second opening therein to pass light from said plate to said tube; the surface of said plate that is exposed by said first opening having interruptions so arranged therein that substantially the same amount of light will reach the tube from all portions of said first opening.

13. In an X-ray photo-timer pick-up device for use between the patient and an X-ray film, a combination including: a photo tube; an X-ray sensitive fluorescent screen; a light-transmitting plate overlying at least a portion of said screen and having one edge positioned near the light-receiving portion of said tube and an opposite edge formed at an acute angle with respect to said screen; a covering around the greater portion of said plate, said covering exhibiting light-reflecting properties at least on the surface contacting said plate and having a first opening therein to pass light from a portion of said screen to said plate and a second opening therein to pass light from said plate to said tube; and light-excluding means encasing said tube, plate, covering and screen.

14. In an X-ray photo-timer pick-up device for use between the patient and an X-ray film, a combination including: a photo tube; an X-ray sensitive fluorescent screen; a light-transmitting plate overlying at least a portion of said screen and having one edge positioned near the light-receiving portion of said tube and an opposite edge formed at an acute angle with respect to said screen; a covering around the greater portion of said plate, said covering exhibiting light-reflecting properties at least on the surface contacting said plate and having a first opening therein to pass light from a portion of said screen to said plate and a second opening therein to pass light from said plate to said tube; and light-excluding means encasing said tube, plate, covering and screen; the surface of said plate that is exposed by said first opening having interruptions so arranged therein that substantially the same amount of light will reach the tube from all portions of said first opening.

15. In an X-ray photo-timer pick-up device for use between the patient and an X-ray film, a combination including: a photo tube; an X-ray sensitive fluorescent screen; a visible light opaque mask of X-ray transparent material superposed over said screen and having an opening therein for passing visible light from a selected area of the screen; a light-transmitting plate adjoining said tube and at least partially superposed over said mask, the area of said plate that overlies the opening in the mask having a series of bands of scorings in its otherwise smooth surface, the width and position of the bands so arranged that substantially the same amount of light will reach the tube from all portions of the screen within said opening.

16. In an X-ray photo-timer pick-up device for use between the patient and an X-ray film, a combination including: a photo-tube; an X-ray sensitive fluorescent screen; a light-transmitting plate overlying at least a portion of said screen and having one edge positioned near the light-receiving portion of said tube and an opposite edge formed at an acute angle with respect to said screen; a covering around the greater portion of said plate, said covering exhibiting light-reflecting properties at least on the surface contacting said plate and having a first opening therein to pass light from a portion of said screen to said plate and a second opening therein to pass light from said plate to said tube; a plurality of sheets of material having greater opacity to X-rays for a given thickness than does said plate, said sheets paralleling said mask and so individually positioned with respect thereto and to the acute-angled edge of said plate that X-rays passing substantially perpendicularly through said screen and obliquely through said acute-angled edge will individually pass through a greater number of sheets as the path of the X-rays through said edge becomes shorter with respect to the path traversed by a neighboring X-ray; and light-excluding means encasing said tube, plate, covering, sheets and screen.

17. In an X-ray photo-timer pick-up device for use between the patient and an X-ray film, a combination including: a photo-tube; an X-ray sensitive fluorescent screen; a light-transmitting plate superposed over a first portion of said screen and reaching substantially to said tube; a mask interposed between said screen and said plate, said mask having an opening therein for passing fluorescent light from a limited portion of said screen to said plate; and means adjoining said plate and extending over at least a portion of the screen that is not superposed by said plate, said means being thinner than said plate but having substantially the same opacity to X-rays.

References Cited by the Examiner
UNITED STATES PATENTS

| | | | |
|---|---|---|---|
| 2,695,964 | 11/54 | Schepker | 250—71 X |
| 2,901,632 | 8/59 | Stava et al. | 250—227 X |
| 3,086,123 | 4/63 | Marchal | 250—227 |

RALPH G. NILSON, *Primary Examiner.*

ARCHIE R. BORCHELT, *Examiner.*